(12) United States Patent
Horie et al.

(10) Patent No.: US 7,390,041 B2
(45) Date of Patent: Jun. 24, 2008

(54) MICRO-MANIPULATOR

(75) Inventors: Mikio Horie, Warabi (JP); Daiki Kamiya, Yokohama (JP); Naoto Mochizuki, Fuefuki (JP); Yoshimichi Yoda, Yamanashi-ken (JP)

(73) Assignees: Nisca Corporation, Minamikoma-Gun, Yamanashi (JP); Tokyo Institute of Technology, Tokyo (JP)

( * ) Notice: Subject to any disclaimer, the term of this patent is extended or adjusted under 35 U.S.C. 154(b) by 0 days.

(21) Appl. No.: 11/142,381

(22) Filed: Jun. 2, 2005

(65) Prior Publication Data

US 2005/0275232 A1 Dec. 15, 2005

(30) Foreign Application Priority Data

Jun. 3, 2004  (JP) ............................. 2004-166126

(51) Int. Cl.
*B25J 7/00* (2006.01)
(52) U.S. Cl. ...................................... 294/86.4
(58) Field of Classification Search ............... 294/86.4, 294/99.1, 99.2, 100; 901/33, 47
See application file for complete search history.

(56) References Cited

U.S. PATENT DOCUMENTS 5,046,773 A * 9/1991 Modesitt ..................... 294/907
6,648,389 B2 * 11/2003 Frey et al. .................. 294/86.4

FOREIGN PATENT DOCUMENTS

DE          10107402      *  8/2002
WO     WO 02/076685      * 10/2002

* cited by examiner

Primary Examiner—Saul J. Rodriguez
Assistant Examiner—Paul T Chin
(74) Attorney, Agent, or Firm—Manabu Kanesaka

(57) ABSTRACT

A micro-manipulator includes a gripping device having two gripping fingers for gripping a micro-material, and a gripping finger moving device for moving at least one of the gripping fingers of the gripping device. An exciting device vibrates the gripping fingers when the gripping fingers of the gripping device are opened to release the micro-material.

1 Claim, 9 Drawing Sheets

Fig. 10(A)
Fig. 10(B)
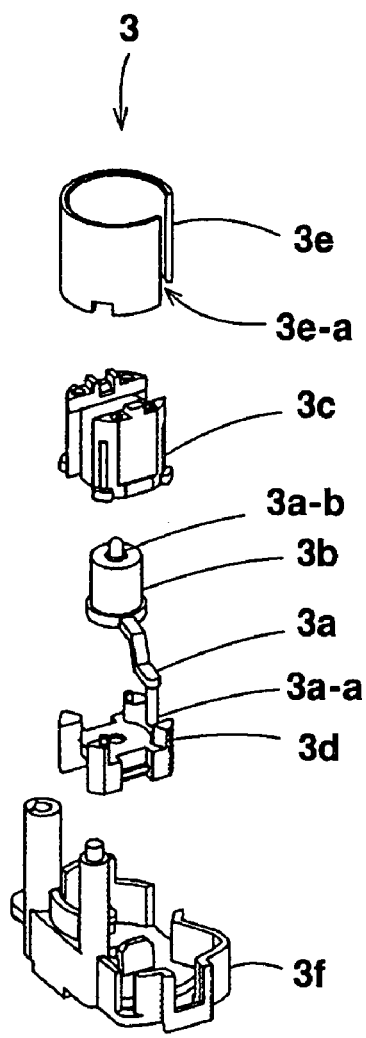
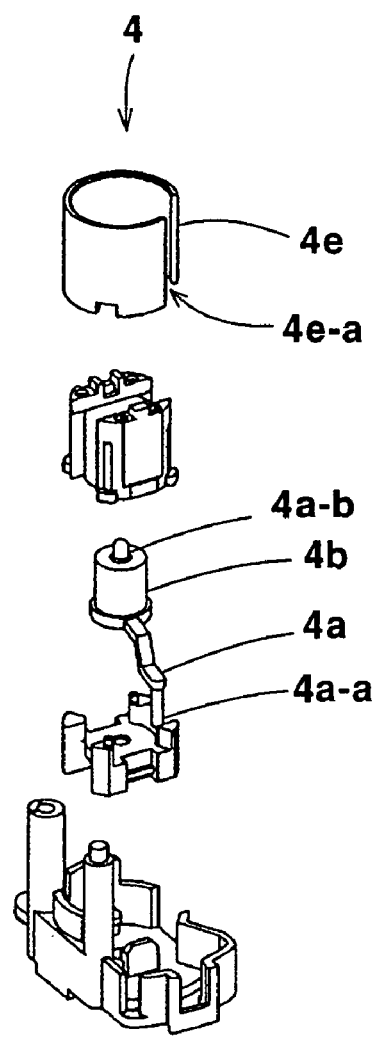

MICRO-MANIPULATOR

BACKGROUND OF THE INVENTION AND RELATED ART STATEMENT

The present invention relates to a micro-manipulator, and particularly to a micro-manipulator that grips a micro-material with two gripping fingers.

Conventionally, a micro-manipulator is used for assembling a micro-component and handling a cell. Generally, in order to grip a micro-material, a micro-manipulator has a mechanism for opening and closing leading ends of gripping fingers around the micro-material (see Patent Reference 1). The micro-manipulator generally handles a small material in a view of a microscope with naked eyes or through an image on a display via a CCD camera mounted on a microscope (see Patent Reference 2).

When an object has a size in a micro-region less than 1 mm, dominant physical phenomenon are different from those in a macro-region in which a conventional industrial product is handled. In other words, in the micro-region, instead of a dominant force of gravity in the macro-region, forces between surfaces such as molecules, liquid linkage forces, and static electricity become dominant. Accordingly, when a micro-material is gripped, while it is possible to grip the micro-material without a large force, it is difficult to separate the micro-material from a gripping finger and place the micro-material at a predetermined position.

In a related field, there is a technology for stabilizing a movement of a micro-manipulator and adjusting an impact, in which a moving mechanism is provided for moving one micro-manipulator tool by a predetermined amount and a shocking mechanism is separately provided for applying an impact to the micro-manipulator (see Patent Reference 3).

Patent Reference 1: Japanese Patent Publication (Kokai) No. 08-168979

Patent Reference 2: Japanese Patent Publication (Kokai) No. 04-303810

Patent Reference 3: Japanese Patent Publication (Kokai) No. 2003-1574

In the conventional micro-manipulators having two gripping fingers, it is difficult to stably place a micro-material at a desired position because of the surfaces force. That is, when the two gripping fingers are separated (opened) to release the micro-material, the micro-material tends to stick to one of the gripping fingers, thereby making it difficult to stably place the micro-material at a desired position. Even if the technology disclosed in Patent Reference 3 is applied, it is necessary to provide the vibrating mechanisms in both of the gripping fingers and the moving mechanism for moving the gripping fingers, thereby making the micro-manipulator large.

In view of the problems mentioned above, an object of the present invention is to provide a micro-manipulator with two gripping fingers capable of stably placing a micro-material at a desired position.

Further objects and advantages of the invention will be apparent from the following description of the invention.

SUMMARY OF THE INVENTION

To attain the objects described above, according to a first aspect of the present invention, a micro-manipulator includes a gripping device having two gripping fingers for gripping a micro-material; a gripping finger moving device for moving at least one of the gripping fingers of the gripping device; and an exciting device for simultaneously vibrating the gripping fingers when the gripping fingers of the gripping device gripping the micro-material are opened to release the micro-material.

In the first aspect, the gripping device has the two gripping fingers. The gripping finger moving device moves at least one of the gripping fingers to grip the micro-material with the gripping fingers of the gripping device. When the gripping finger moving device moves the gripping fingers in opposite directions, the gripping fingers release the micro-material. When the gripping fingers are opened to release the micro-material, the exciting device simultaneously excites the leading ends of the gripping fingers. The gripping finger moving device opens the gripping fingers, while the exciting device simultaneously vibrates both of the leading ends of the gripping fingers gripping the micro-material. Accordingly, when the micro-material is released from the gripping fingers, attraction of a surface force is released, thereby making it possible to place the micro-material at a desired position.

In the first aspect, the exciting device may have a single piezoelectric element and a vibration transmission member for transmitting vibrations to the leading ends of the gripping fingers from the piezoelectric element. Accordingly, it is not necessary to dispose the piezoelectric element or the vibration transmission member for each of the gripping fingers, thereby making the micro-manipulator small. The vibration transmission member may be branched at the leading ends of the gripping fingers. The exciting device preferably excites the leading ends of the gripping fingers in a direction perpendicular to a direction that the gripping device grips the micro-material, thereby reducing a pressing force on the micro-material.

According to a second aspect of the present invention, a micro-manipulator includes a gripping device having two gripping fingers for gripping a micro-material; a gripping finger moving device for moving at least one of the gripping fingers of the gripping device; a detachment device having one detachment finger for touching the micro-material gripped by the gripping device and separating the micro-material from the gripping device; and an exciting device for simultaneously exciting a leading end of the detachment finger when the gripping fingers of the gripping device gripping the micro-material are opened.

In the second aspect, the gripping device has the two gripping fingers. The gripping finger moving device moves at least one of the gripping fingers to grip the micro-material. The detachment finger of the detachment device touches the micro-material gripped by the gripping device, and the gripping finger moving device moves the gripping fingers in a direction perpendicular to the gripping direction, so that the gripping fingers release the micro-material. The exciting device excites a leading end of the detachment finger when the gripping fingers gripping the micro-material are opened. The detachment finger touches the micro-material being gripped by the gripping fingers, and the gripping finger moving device opens the gripping fingers while the exciting device excites the detachment finger. Accordingly, when the micro-material is separated from the gripping fingers and the detachment finger, the attraction of the surface force is released, thereby making it possible to place the micro-material at a desired position.

In the second embodiment, the exciting device may have a piezoelectric element and a vibration transmission member for transmitting vibrations from the piezoelectric element to the leading end of the detachment finger. Furthermore, in order to place the micro-material at a desired position on a positioning surface, the detachment device preferably presses the micro-material gripped by the gripping device in a direction perpendicular to a direction that the gripping device grips the micro-material. A detachment moving device may be provided for moving the leading end of the detachment finger upwardly between the gripping fingers of the gripping device.

According to the first aspect of the present invention, the gripping finger moving device opens the gripping fingers while the exciting device excites the leading ends of the gripping fingers gripping the micro-material. Accordingly, when the micro-material is released from the gripping fingers, the attraction of a surface force is released, thereby making it possible to place the micro-material at an intended position. According to the second embodiment of the present invention, the detachment finger touches the micro-material gripped by the gripping fingers, and the gripping finger moving device opens the gripping fingers while the exciting device vibrates the detachment finger. Accordingly, when the micro-material is released from the gripping fingers and detachment finger, the attraction of a surface force is released, thereby making it possible to place the micro-material at an intended.

BRIEF DESCRIPTION OF THE DRAWINGS

FIGS. 10(A) and 10(B) are exploded perspective views of an actuator, wherein FIG. 10(A) shows a gripping finger drive actuator, and FIG. 10(B) shows a detachment finger drive actuator;

FIGS. 11(A) to 11(F) are perspective views of the micro-gripper mechanism in an operating state, wherein FIG. 11(A) is a first operating state, FIG. 11(B) is a second operating stat, FIG. 11(C) is a third operating state, FIG. 11(D) is a fourth operating state, FIG. 11(E) is a fifth operating state, and FIG. 11(F) is a sixth operating state;

DETAILED DESCRIPTION OF PREFERRED EMBODIMENTS

First Embodiment

Hereunder, according to a first embodiment of the present invention, a micro-manipulator in a micro-material handling system for handling a micro-material will be explained with reference to the accompanying drawings. According to the first embodiment, leading ends of gripping fingers are excited when opening (or separating) two gripping fingers gripping a micro-material.

Figure 1:
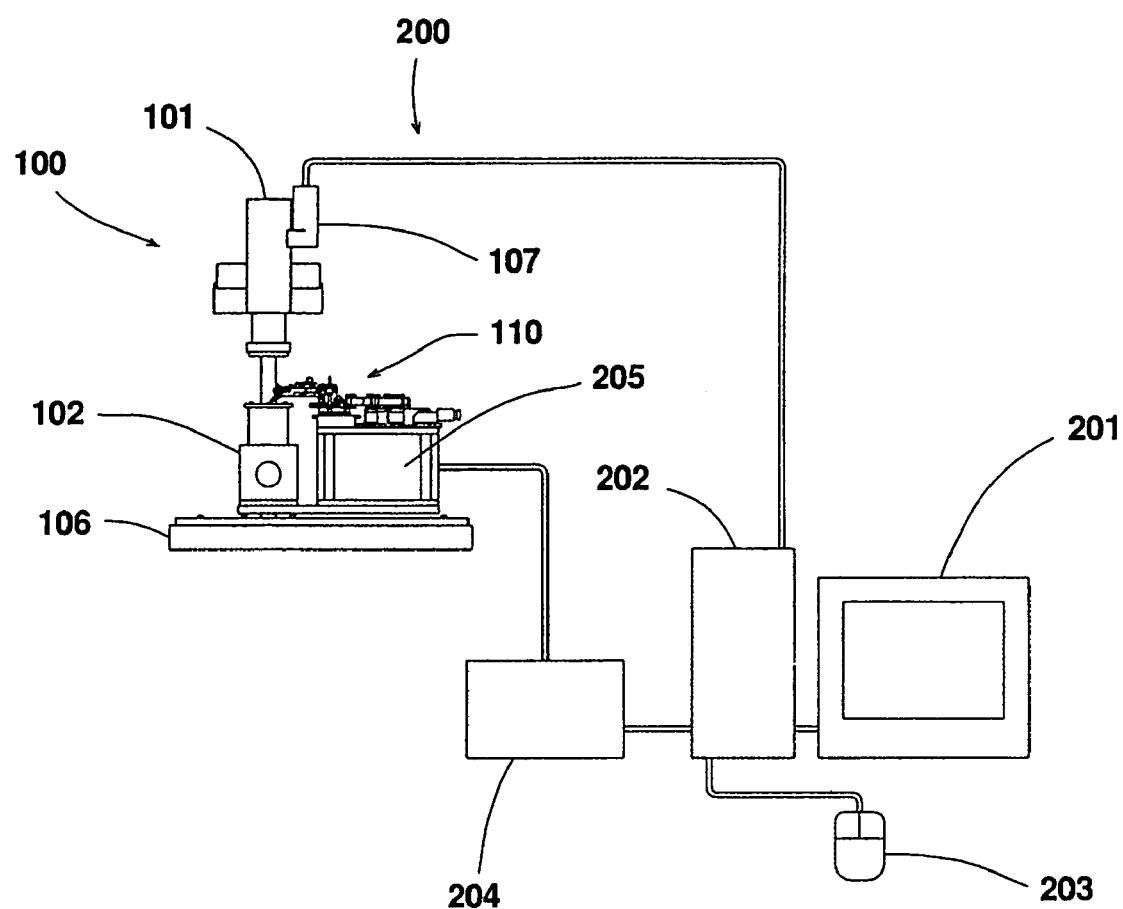
FIG. 1 is a schematic diagram showing a micro-material handling system according to a first embodiment of the present invention.

As shown in FIG. 1, a micro-material handling system 200 of has a micro-material handling device 100 mounted on a thick plate-shaped base 106, and includes a micro-manipulator 110, a micro-material stage 102, and a microscope 101. The micro-material handling system 200 is also equipped with a personal computer (hereinafter referred to as a PC) 202, and a programmable logic controller (hereinafter referred to as PLC) 204 as a slave computer of the PC 202 for controlling the micro-manipulator 110.

The PC 202 is connected with a liquid crystal display device 201 and an input device 203 such as a mouse. The microscope 101 has a CCD camera 107. Output terminals from the CCD camera 107 are connected to the PC 202. An operator of the micro-material handling system 200 can look directly through an eyepiece on the microscope 101, or view the micro-material placed on a micro-material stage surface 17 via the display device 201.

The PC 202 is connected to the PLC 204 via an interface. The PLC 204 is connected to a relay board 205 mounted with a drive control unit for controlling the drive of actuators disposed on the micro-manipulator 110. The relay board 205 and actuators disposed on the micro-manipulator 110 are connected by a flexible circuit board (not shown). The PLC 204 has a D/A converter, and an A/D converter in addition to a CPU, ROM, and RAM. The PLC 204 receives operating instructions from the PC 202, and sends data detected by a sensor (described below) and statuses of the actuators to the PC 202 via an Ethernet interface according to programs and program data stored in the ROM.

Figure 2:
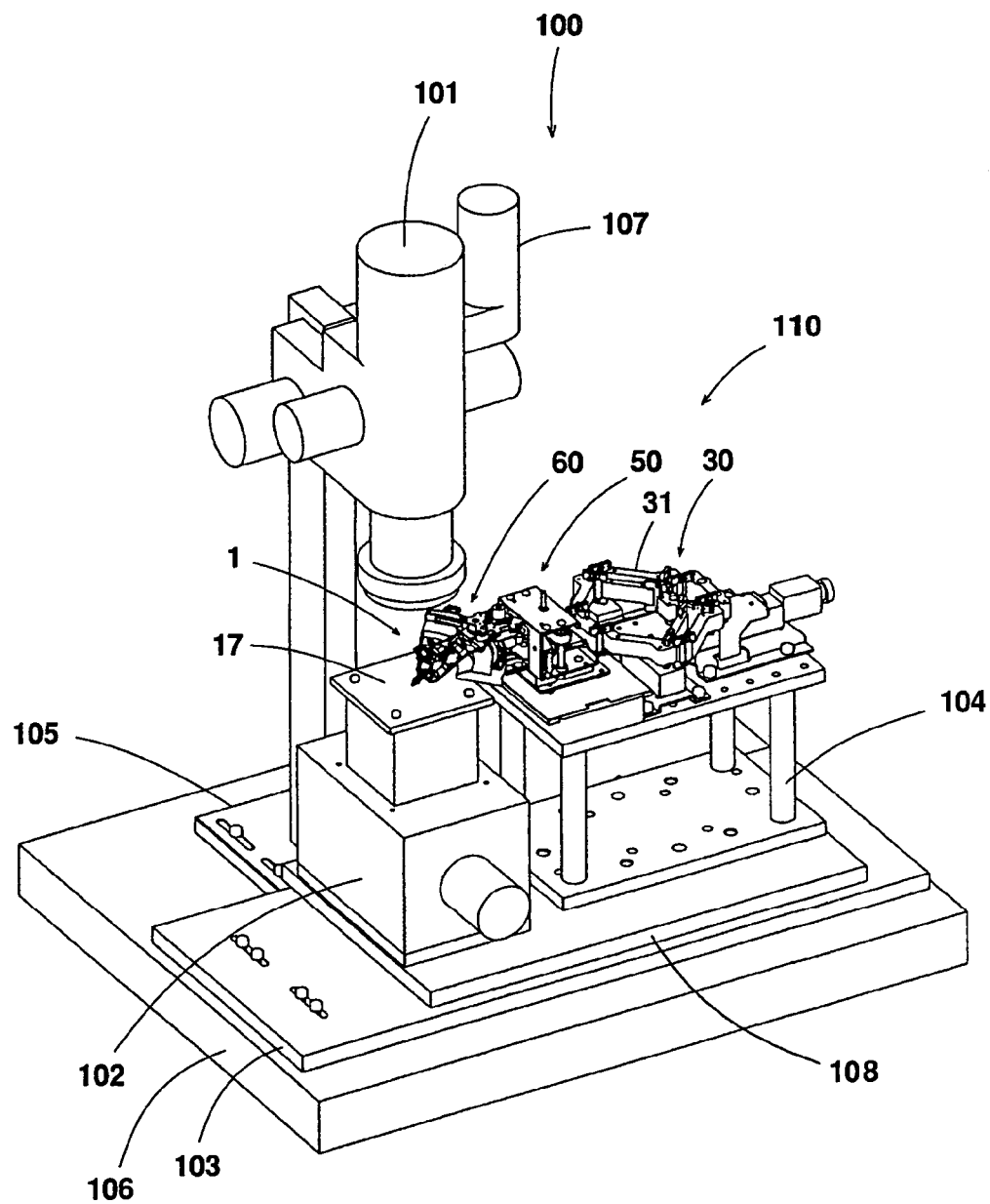
FIG. 2 is a perspective view of a micro-manipulator of the micro-material handling system.

As shown in FIG. 2, a plate-shaped microscope stand 105 and a support stand 103 are mounted on a base 106. A top of the microscope stand 105 has a support strut for supporting the microscope 101. Mounted to a top of the support stand 103 is a plate-shaped, micro-material/manipulator base 108 that has a smaller surface area than the support stand 103. The block-shaped micro-material stage 102 and a manipulator support stage 104 with four support legs for fastening the micro-manipulator 100 are fastened to a top of the micro-material/manipulator base 108. The relay board 205 described above is fastened to the manipulator support stage 104 legs.

A top of the micro-material stage 102 has the substantially horizontal micro-material stage surface 17 where micro-materials are placed. The lengths of the manipulator support stage 104 legs and the fastening position on the micro-material/manipulator stage 108 are set so that the end effecters 7 and 8 (see FIG. 9) mounted to leading ends of the two grippers (described below) are always positioned in the center of the micro-material stage surface 17. The microscope 101 is supported on the microscope support stand 105 by the support strut (described above), so that an objective lens thereof is positioned substantially in the center of the micro-material stage surface 17.

Figure 3:
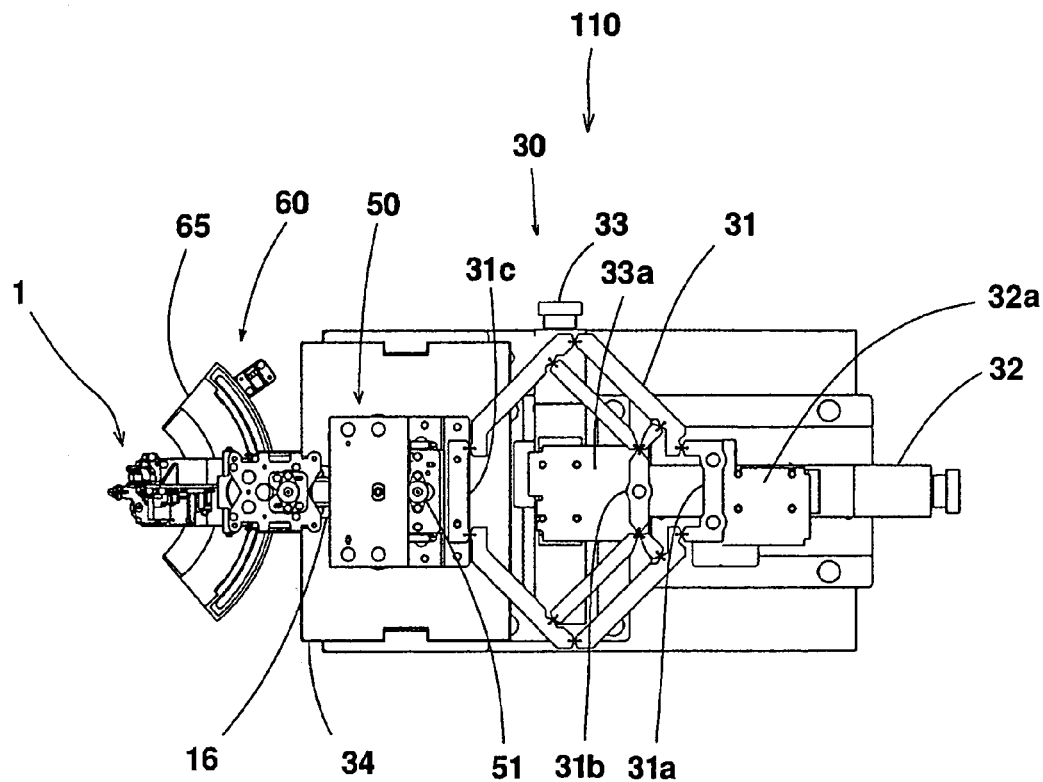
FIG. 3 is a plan view of the micro-manipulator.
Figure 4:
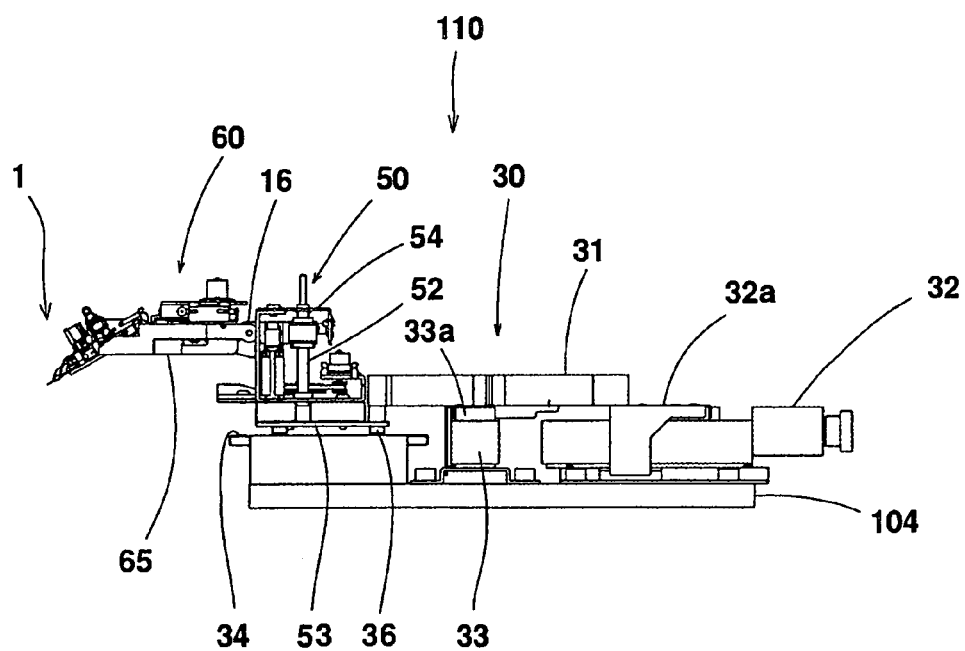
FIG. 4 is a side view of the micro-manipulator.

As shown in FIGS. 2 to 4, the micro-manipulator 110 is provided with a micro-gripper mechanism 1; a position changing mechanism 60 for simultaneously changing positions of the end effecters 7 and 8 in the XY directions; an XY moving mechanism 30 for moving the micro-gripper mechanism 1 and the position changing mechanism 60 in the X and Y directions; and a Z moving mechanism 50 for moving the micro-gripper mechanism 1 and the position changing mechanism 60 in the Z direction that intersects the X and Y directions. The position changing mechanism 60 rotates along an arc centering on the end effecters 7 and 8.

As shown in FIGS. 3 and 4, the XY moving mechanism 30 is provided with an X direction actuator 32 comprising an advancing mechanism, an encoder, and a stepping motor capable of forward and reverse drives; a Y direction actuator 33 comprising an advancing mechanism, an encoder, and a stepping motor capable of forward and reverse drives; an X direction input unit 31a; a Y direction input unit 31b; and an X-Y direction output unit 31c mounted to the Z moving mechanism 50. Further provided is a parallel quadric mechanism 31 arranged with two pantographs along an imaginary line between each of the central points of the X direction input unit 31a, the Y direction input unit 31b, and the XY direction output unit 31c. When advancing drive forces from the X direction actuator 32 and the Y direction actuator 33 are input to the X direction input unit 31a and the Y direction input unit 31b, the two pantographs become displaced. An amount of displacement is synthesized and expanded in the X and Y directions and output to the X-Y direction output unit 31c.

The Z moving mechanism 50 has a flat plate-shaped bottom frame 53. The X-Y direction output unit 31c is fastened to the bottom frame 53. Corners of the bottom frame 53 have four micro-casters 36. The bottom frame 53 moves according to an output from the X-Y direction output unit 31c in the X and Y directions over the support stand 34 mounted to the manipulator support stage 104. The Z moving mechanism 50 has a moving frame 54 positioned above the bottom frame 53 for moving toward and away from the bottom frame 53 in the Z direction. Stored in the moving frame 54 is a direct acting mechanism that includes a Z direction actuator 51 having a stepping motor capable of both forward and reverse drives, and a shaft 52 with one end supported by the bottom frame 53. The moving frame 54 separates from the bottom frame 53 by the forward rotation of the Z direction actuator 51. The reverse rotation of the Z direction actuator 51 causes the moving frame 54 to move near to the bottom frame 53.

It is possible to move the moving frame 54 in the Z direction relative to the bottom frame 53. Accordingly, the moving frame 54 can move in the three dimensional directions of X, Y, and Z by the drive force received from the X direction actuator 32, the Y direction actuator 33, and the Z direction actuator 51. The position changing mechanism 60 is fixed to the moving frame 54.

Figure 5:
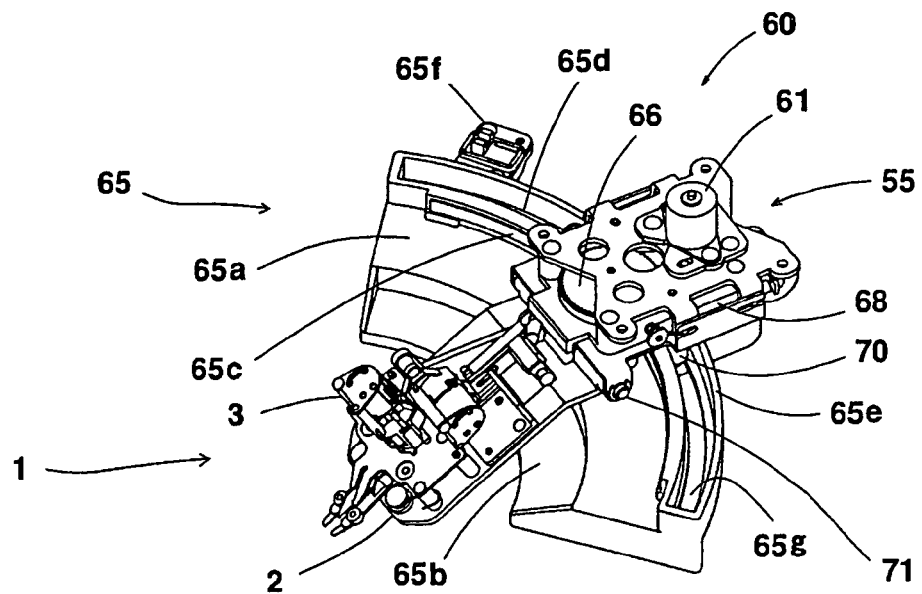
FIG. 5 is a perspective view of a micro-gripper mechanism and a position changing mechanism of the micro-manipulator.

As is shown in FIG. 5, the position changing mechanism 60 is composed of a substantially fan-shaped base frame 65, and a moving unit 55 that is movable with regard to the base frame 65. The micro-gripper mechanism 1 is connected to the leading end of the moving unit 55.

The base frame 65 has a substantially fan-shaped and substantially horizontal sliding surface 65a composing a central section of the base frame 65; a substantially fan-shaped oblique slide surface 65b adjacent to the end effecters 7 and 8 of the slide surface 65 and tapered at an angle of substantially 30 degrees; a curved wall 65d adjacent to the moving frame 54 of the sliding surface 65a forming a portion (arc) around the end effecters 7 and 8; a toothed belt 65c fastened to the sliding surface 65a of the curved wall 65d; a curved wall 65e forming a portion around the end effecters 7 and 8 and opposing the curved wall 65d; and a transmissive unitized sensor 65f fastened to one side of the curved wall 65e. Note that an arced groove 65g is formed between the curved walls 65d and 65e.

The position changing 61 composed of a stepping motor capable of both forward and reverse drives is mounted to the moving unit 55. An actuator shaft of the position changing actuator 61 mates with a pulley gear, so that a rotational drive force from the position changing actuator 61 is transmitted to the deceleration gear 66 via the toothed endless belt. The rotating shaft of the deceleration gear 66 mates with a large diameter gear and a small diameter gear (not shown) arranged below the large diameter gear. Note that the small diameter gear projects toward the base frame 65 and passes through the moving unit 55. Two cylindrical protruding sliders and two shafts (not shown) protrude from the moving unit 55 toward the base frame 65. Each of the shafts rotatably supports a roller 70. A rectangular plate-shaped douser (not shown) is implanted to face the base frame 65.

The small diameter gear of the moving unit 55 mates with the toothed belt 65c of the base frame 65. The roller 70 of the moving unit 50 is arranged in the groove 65g of the base frame 65 and touches the curved surface of the curved wall 65d. Note that a spring 68 is stretched so that the small diameter gear presses the curved wall 65d. A leading end of a slider (not shown) touches the sliding surface 65b of the base frame 65. Therefore, drive from the position changing actuator 61 is transmitted to the small diameter gear that mates with the toothed belt 65b, so that the moving unit 55 moves along an arc on the base frame 65 centering on the end effecters 7 and 8.

Figure 6:
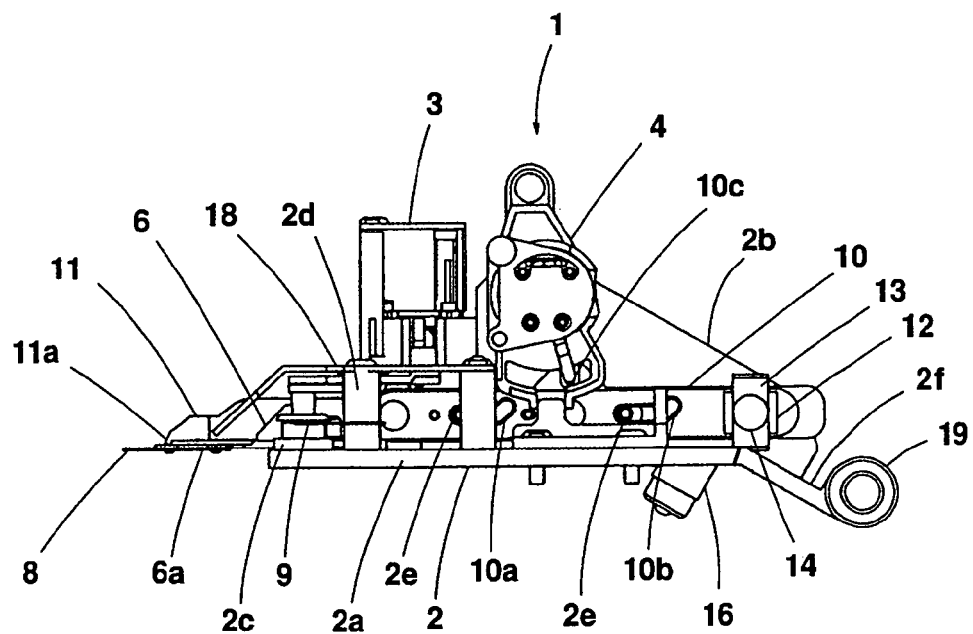
FIG. 6 is a side view of the micro-manipulator according to the first embodiment of the present invention.
Figure 7:
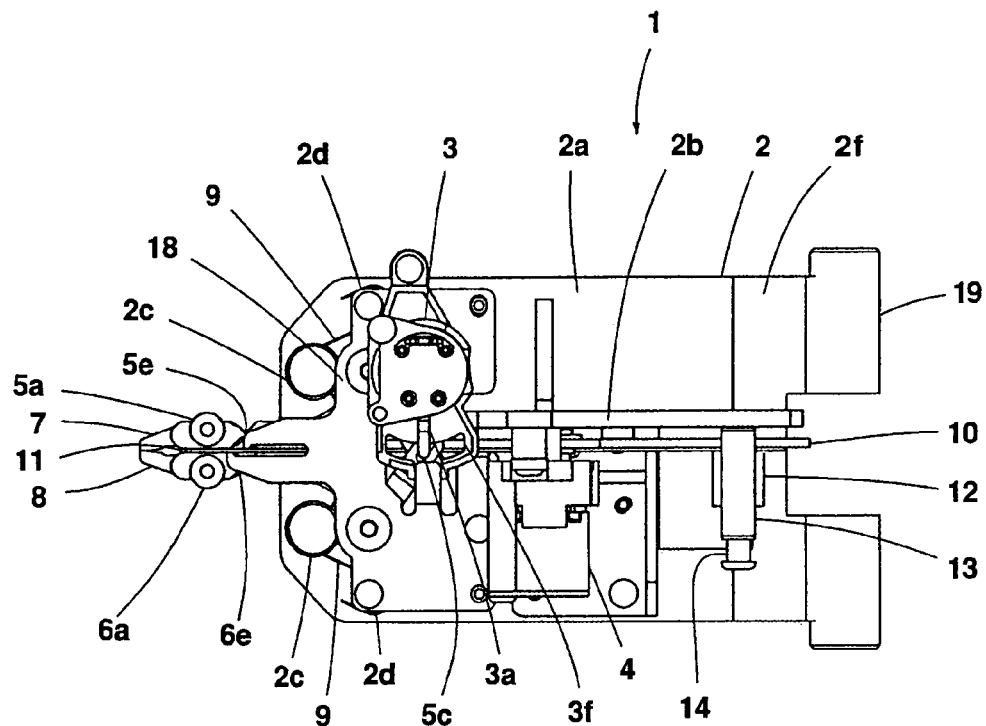
FIG. 7 is a plan view of the micro-gripper mechanism according to the first embodiment of the present invention.
Figure 8:
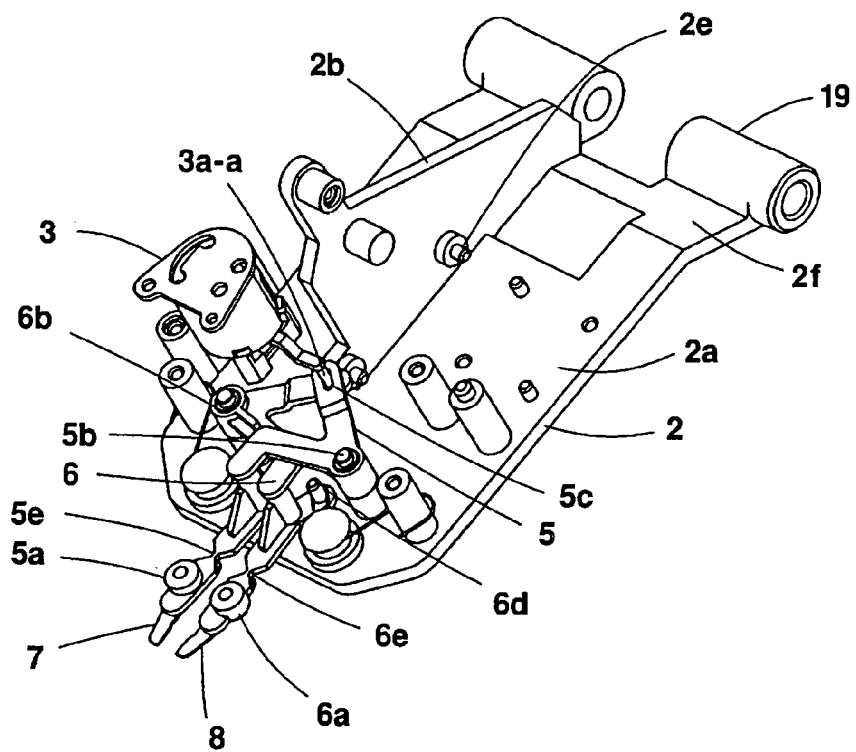
FIG. 8 is a perspective view of the micro-gripper mechanism in an assembly process.

As shown in FIGS. 6 to 8, the micro-gripper mechanism 1 has a base frame 2 comprising a substantially rectangular surface 2a; a perpendicular wall 2b established perpendicular to the surface 2a and having bosses 2e projecting at two locations; and an oblique portion 2f obliquely projecting from the surface 2a toward the moving unit 55 and formed into one body with a cylindrical member 19 at an end thereof.

The surface 2a of the base frame 2 has bosses 2d. An actuator fastening plate 18 having a flat surface is screwed to the top portion of the bosses 2d. A surface of the actuator fastening plate 18 is fastened with a gripping finger drive actuator 3 composed of an electromagnetic drive meter as a gripping finger moving device that drive (move) the two gripping fingers.

As shown in FIG. 10(A), the gripping finger drive actuator 3 has a two-poled magnetized cylindrical rare earth magnet 3b at a central location in a diameter direction. A rotating shaft 3a-b passes through the center of the rare earth magnet 3b. A bottom of the rare earth magnet 3b has a ring-shaped member with an arm 3a projecting therefrom. A pin 3a-a projects downwardly from the arm 3a. Note that the arm 3a and the pin 3a-a are formed into one body with the ring-shaped member. The rare earth magnet 3b is stored inside a bobbin case that has a cylindrical inner space and an inner lid case 3d that forms a bottom cover for the bobbin case 3d and is mounted to the bobbin case 3c. The upper and lower ends of the rotating shaft 3a-b are rotatably supported by the bobbin case 3c and inner lid case 3d.

On the outer side of the bobbin case 3c are wrapped two strands of copper coil (not shown). One of the copper coils is a main coil for generating torque for rotating the rare earth magnet 3b. The other copper coil is an assist coil for reducing torque by detecting a counter-electromotive force generated by a change in a magnetic field of the magnet operated by the main coil.

The bobbin case 3c is stored inside a cylindrical yoke 3e that has a gap 3e-a and forms a closed loop of the line of magnetic force of the rare earth magnet 3b. The yoke 3e is fastened to the bottom lid 31, and an angle controlling member for controlling the rotating angle of the arm 3a is formed as one body with the bottom lid 31. Note that the gripper finger drive actuator 3 has an upper lid (omitted in FIGS. 10(A) and 10(B)) arranged on the upper side of the yoke 3e.

As is shown in FIG. 8, the two gripper fingers 5 and 6 have V-shaped plan view portions, and T-shaped side view portions formed into one body with the V-shaped portions as gripping device. The side view shapes of the reversed T-shaped portions are substantially T-shaped. The central crevice portions of the V-shaped portions of the gripping fingers 5 and 6 are fastened to rotating support shafts 5b and 6b that are rotatably supported on bosses disposed on the surface 2a of the base frame 2. At the ends of one side of the gripper fingers 5 and 6 are formed slits 5c and 6c (6c, not shown). The pin 3a-a of the gripper finger drive actuator 3 engages the slits 5c and 6c.

An upper end side of the T-shaped portion is fastened to the bottom surface of the end of the other side of the V-shaped portion and protrusions for hooking springs are formed one side (the opposite side of the end effecters 7 and 8). One of the hooks of a coiled coil spring 9 the central portion thereof being locked to a spring locking boss 2c is locked to the protrusion. The hook portion of the other end of the coil spring 9 is locked to a boss 2d that is nearest to the end effecters of a plurality of bosses 2d. Elastic hinges 5e and 6e having a cross-section with a neck portion smaller than that of the other portion are formed into one body with the other end of the reversed T-shaped portion. End effecter mounting portions 5a and 6a are disposed on the leading of the gripping fingers for mounting the end effecters 7 and 8 on the leading end of the gripping fingers. Each of the end effecter mounting portions 5a and 6a are mounted by minute screws, so that the end effecters can be replaced.

Therefore, the gripping fingers 5 and 6 rotate around the rotating support shafts 5b and 6b, and the end effecters 7 and 8 are normally pressed to touch each other through the urging force of the coil spring 9 because one side of the reversed T-shaped portion is urged by the coil spring 9. The hinges 5e and 6e deform with the urging force to balance the resilient force.

Figure 9:
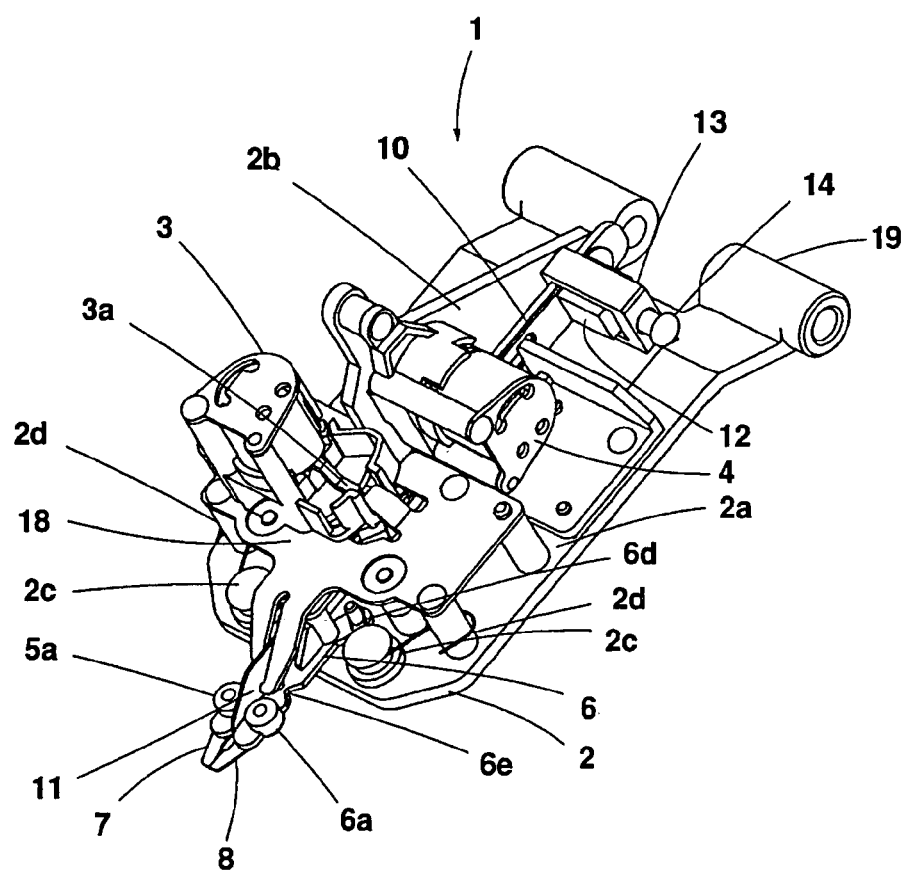
FIG. 9 is a perspective view of the micro-gripper mechanism.

As shown in FIGS. 6, 7 and 9, the perpendicular wall 2b of the base frame 2 has a detachment finger drive actuator 4 as a detachment finger moving device for driving a detachment finger 10 as a substantially plate-shaped detachment device and a vibration transmission member to the left and right directions in FIG. 6 on a plane with and parallel to the perpendicular wall 2b. The detachment finger drive actuator 4 is the same kind of electromagnetic drive meter as the gripping finger drive actuator 3, and the configuring members are also the same as the gripping finger drive actuator 3 (see FIG. 10(B)). An arm 4a of the detachment finger drive actuator 4 has a self holding moment by a pole of the rare earth magnet 4b being pulled by a concentrated magnetic force to a gap 4e-a formed in a yoke 4e. The direction of the generation of the self holding moment is the counterclockwise direction (ccw) with regard to a rotating shaft 4a-b in FIG. 6.

From substantially the center, the detachment finger 10 projects upwardly. An elongated slit 10c is formed at the projecting location. A pin 4a-a of the detachment finger drive actuator 4 engages the slit 10c. Slit cams 10a and 10b are formed on both sides of the projecting location of the detachment finger 10. Each of the bosses 2e (see FIG. 8) projecting from the perpendicular wall 2b engages one of the slit cams 10a and 10b. The self holding moment of the detachment finger drive actuator 4 normally urges the detachment finger 10 to the right direction in FIG. 6 (when the detachment finger drive actuator 3 is not energized), and the top right ends of the slit cams 10a and 10b stop at a position touching the bosses 2e.

One side of the detachment finger 10 (oblique portion 2f side) is fastened by a screw 14 with a laminated piezoelectric element actuator 12 to an actuator mounting member 13, so that the side of the detachment finger 10 touches the face of the output end of the laminated piezoelectric element actuator 12 that acts as an excitation device and a piezoelectric element. That is, the laminated piezoelectric element actuator 12 and the actuator mounting member 13 are fastened to one side of the detachment finger 10. The driving force from the detachment finger drive actuator 4 moves the detachment finger 10 over the surface 2a to the left and right in FIG. 6.

The other side of the detachment finger 10 (the end effecter 7 and 8 side) projects in a straight line to the end effecters 7 and 8 side between the V-shaped portions that intersect the two gripping fingers 5 and 6 and the reversed T-shaped portions that are arranged substantially in parallel. The actuator fastening plate 18 has an oblique portion projecting from the flat portion toward the end effecters 7 and 8 that splits into two. The oblique portion is arranged to straddle the other side of the detachment finger 10. The other end of the oblique portion slightly projects to the detachment finger 10 for guiding the straight-shaped detachment finger 10 that moves left and right in FIG. 6 near to the end effecter mounting portions 5a and 6a. The other side of the detachment finger 10 (the end effecters 7 and 8 side) is formed as a single body with a detachment end effecter 11 that touches the micro-materials for gripping or attracting and releasing the micro-materials using the end effecters 7 and 8. The detachment end effecter 11 has an end 11a smaller than a contact surface area with the micro-materials, so that the effect (the attracting force) on the micro-materials of the surfaces forces is reduced.

The bottom side of the surface 2a of the base frame 2 has a cylindrical slider 16 installed obliquely. A leading end of the slider 16 touches a slide oblique surface 2b of the base frame 65 of the position changing mechanism 60. As shown in FIG. 5, the base frame 2 is fastened to the moving unit 55 by passing the shaft 71 of the moving unit 55 through a cylindrical barrel of a cylindrical barrel member 19 at the end of the oblique portion 2f. The micro-gripper mechanism is obliquely installed at an angle of substantially 30° degrees toward the bottom, so that the end effecters 7 and 8 can grip the micro-materials on the micro-material stage surface 17. Therefore, in a state where the micro-gripper mechanism 1 is linked to the position changing mechanism 60, the oblique portion 2f of the base frame 2 is substantially horizontally arranged, and the surface 2a is obliquely arranged at substantially 30° degrees.

(Operation)

The following describes an action of the micro-material handling system 200 when the micro-material is gripped and placed at a predetermined placement position.

Figure 11A:
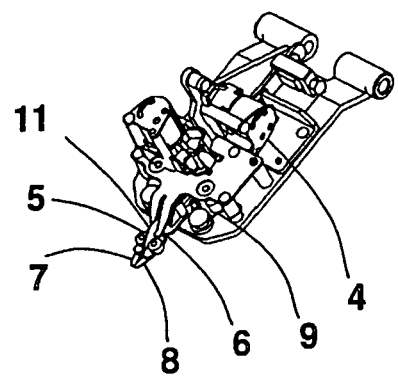

Initially, the power to the all of the parts that configure the micro-material handling system such as the PC 202 and the micro-manipulator 110 is turned on. When an application software program installed in the PC 202 is turned on and the initializing setting processes of the microcomputer 110 are completed, the PLC 204 (the CPU on the PLC 204) sends the status of the actuators and the sensors on the micro-manipulator 110 to the PC 202. In this state, the end effecters 7 and 8 on the gripping fingers 5 and 6 are urged into mutual contact by the spring 9. The self holding moment of the detachment finger drive actuator 4 causes the pin 4a-a to press the slit 10c, so that the upper right ends of the slit cams 10a and 10b on the detachment finger 10 are stopped at a position touching the boss 2e as shown in FIG. 6. (See the state shown in FIG. 11(A).)

The PC 202 references program data and judges whether there is an error in the detected status. If an error is judged, the PC displays a location of the error and a degree of the error on the display 201. If no error is judged (or the degree of the error is a low level), the PC displays a prompt to the operator whether it is acceptable to position the end effecters 7 and 8 at a reference position, so that they do not carelessly touch the specimen (for example of Petrie dish containing cells) placed on the micro-material stage surface 17, and then idles until there is an affirmative input from an input device 203. When there is an input from the input device 203, the PC 202 issues an instruction to position the end effecters 7 and 8 in a reference position with regard to the PLC 204.

The PLC 204 drives the position changing actuator 61 to move the moving unit 55 toward the sensors 65f and determines whether there is any change in the binary signals issued from the sensors 65f. When a douser (not shown) interrupts light emitting from the sensor 65f, the signals emitted from the sensor 65f are switched from a low level to a high level, so that the PLC 204 ascertains whether the moving unit 55 reaches the reference position. In other wards, the PLC 204 is able to obtain the position coordinates, i.e., the references for the end effecters 7 and 8 in the X and Y directions. The PLC 204 stops the drive of the position changing actuator 61 when the moving unit 55 reaches the reference position. Then, the PLC 204 notifies the PC 202 that the preparations of the micro-material handling system are completed.

The PC 202 displays a message that the system is ready for handling the micro-material in a small window on the display 201, and idles until there is an input from the input device 203. While referring to the microscope image on the display 201, the operator inputs instructions using the input device 203, so that the end effecters 7 and 8 separate to form an opening therebetween. The PC 202 instructs the PLC 204 to separate the end effecters 7 and 8, and then idles until there is an input from the input device 203. The PLC 204 drives (energizes) the gripping finger drive actuator 3, so that the arm 3a of the gripping finger drive actuator 3 rotates in the counterclockwise direction around the rotating shaft 3a-b and the pin 3a-a presses the slits 5c and 6c of the gripping fingers 5 and 6. The gripping FIGS. 5 and 6 each rotates around the rotating support shafts 5b and 6b, so that the end effecters 7 and 8 separate from each other to form an opening therebetween.

While referring to the microscope image on the display 201 the operator inputs instructions using the input device 203, so that the micro-material is positioned at the opening formed between the end effecters 7 and 8.

Figure 11B:
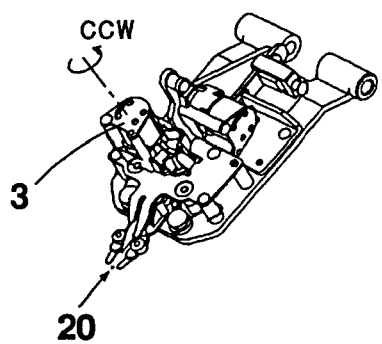

According to the embodiment of the present invention, the input operation is supported by the application software program on the PC. A mouse can be used to drag and drop, or right and left buttons thereof can be clicked in the process. The PC 202 converts input information from the input device 203 into the X, Y, and Z direction components and then transfers the converted information to the PLC 204. The PLC 204 drives the X direction actuator 32 and the Y direction actuator 33 of the X-Y moving mechanism 30, and the Z direction actuator 51 of the Z moving mechanism 50 to move the micro-material 20 to a position at the opening between the end effecters 7 and 8 (see the state shown in FIG. 11(B)), and waits for instructions to be issued from the PC 202.

When the micro-material is a cell, there are locations where gripping is not preferred or to be handled, and a shape is not limited to a spherical shape. For that reason, it is necessary to change the gripping direction of the end effecters 7 and 8 with regard to the micro-material 20. In this case, the operator inputs information using the input device 203, so that the end effecters 7 and 8 are able to grip the micro-material 20 at the proper positioning. The PC 202 converts input information from the input device 203 and then transfers the converted information to the PLC 204. The PLC 204 drives the position changing actuator 61 to rotate the moving unit 55 on the base frame 65 centering on the end effecters 7 and 8 in an arc, then idles until there are instructions from the PC 202. Accordingly, the end effecters 7 and 8 can grip the micro-material 20 with the proper positioning (direction).

Figure 11C:
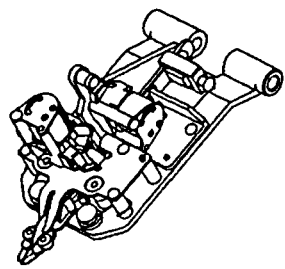

When the position is correct with regard to the micro-material 20, the operator inputs gripping instructions with the input device 203 for gripping the micro-material 20 using the end effecters 7 and 8 of the gripping fingers 5 and 6. The PC 202 converts the gripping instructions from the input device 203 and then transfers the converted information to the PLC 204. The PLC 204 drives the gripper finger drive actuator 3 to grip the micro-material using the end effecters 7 and 8 and waits until there are instructions from the PC 202. In other words, the arm 3a energized and controlled by the gripper finger drive actuator 3 rotates in the clockwise (cw) direction to cause the end effecters 7 and 8 that are held in a mutually separated state to approach each other. After the micro-material 20 is gripped by the end effecters 7 and 8 with the torque from the gripper finger drive actuator 3 and the urging force of the spring 9, the power from the gripper finger drive actuator 3 is shut off. Accordingly, only the urging force of the spring 9 is acting on the micro-material 20 via the resilient hinges 5e and 6e of the gripping fingers 5 and 6 (see FIG. 11(C)).

The operator inputs the instructions with the input device 203, so that the end effecters 7 and 8 are positioned at any position (for example, the middle of the Petri dish) while the micro-material 20 is gripped by the end effecters 7 and 8. The PC 202 converts the input information from the input device 203 and then transfers the converted information to the PLC 204. The PLC 204 drives the X-Y moving mechanism 30 and the Z moving mechanism 50 to move the end effecters 7 and 8 to the specified placement position, and then idles until there are instructions from the PC 202.

Depending on the shape of the micro-material 20, there are cases in which the gripping direction of the end effecters 7 and 8 gripping the micro-material 20 and the direction of placement are not aligned. A typical example includes a case in which the micro-material 20 is a rectangular shaped chip element and placed in a position on a printed circuit board. In this case, the operator inputs data with the input device 203, so that the end effecters 7 and 8 align with the direction of the placement position of the micro-material 20. The PC 202 converts input information from the input device 203 and then transfers the converted information to the PLC 204. The PLC 204 drives the position changing actuator 61 to rotate the moving unit 55 on the base frame 65 around the end effecters 7 and 8 in an arc, and then idles until there are instructions from the PC 202. Accordingly, the end effecters 7 and 8 align with the direction of the placement position.

Figure 11D:
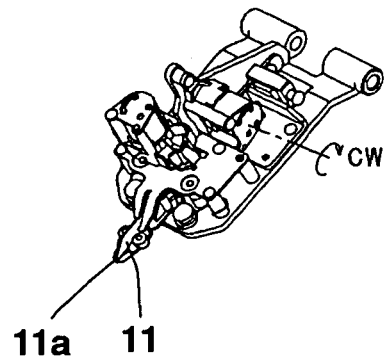

The operator inputs detaching instructions with the input device 203 for detaching the micro-material 20 from the end effecters 7 and 8 because the micro-material 20 gripped by the end effecters 7 and 8 is positioned at the placement position. The PC 202 converts the separating instructions from the input device 203 and then transfers that converted information to the PLC 204. The PLC 204 drives the detachment finger drive actuator 4. This causes the arm 4a of the detachment finger drive actuator 4 to rotate in the clockwise (cw) direction around the rotating shaft 4a-b, resisting the self holding moment. The detachment finger 10 is guided to the lower left direction of FIG. 6 by the slit cams 10a and 10b that engage the boss 2e. The leading end 11a of the detachment end effecter 11 pushes the micro-material 20 to the micro-material stage surface 17 from above. (See FIG. 11(D).)

Figure 11E:
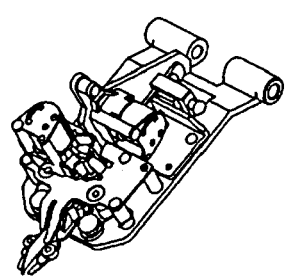
Figure 11F:
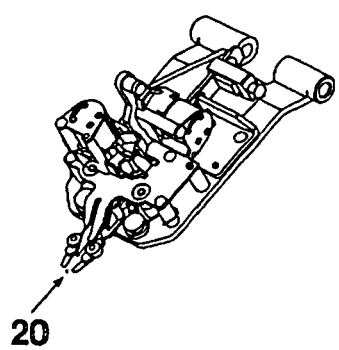

Next, PLC 204 inputs stepping voltages into the laminated piezoelectric element actuator 12 thereby causing the actuator 12 to vibrate, then drives the gripping finger drive actuator 3 to separate the micro-material 20 from the end effecters 7 and 8 of the gripping FIGS. 5 and 6. Vibrations from the laminated piezoelectric element actuator 12 are transmitted to the detachment end effecter 11 that is pressing the micro-material 20 with the leading ends 11a, thereby transmitting the shock of the vibrations to the micrometer of 20 while freeing the grip of the micro-material 20 by the end effecters 7 and 8. Through this, the micro-material is freed from the surfaces forces of the end effecters 7 and 8 and the detachment end effecter 11 and the micro-material 20 is placed on the placing position. (See FIG. 11(E).) Next, PLC 204 cuts the input of the stepping voltages into the laminated piezoelectric element actuator 12 thereby stopping the vibrations, while driving the detachment finger drive actuator 4 to separate the micro-material 20 from the detachment end effecter 11 (the leading ends 11a). (See FIG. 11(F).)

Thus, the gripping and placing of the micro-material 20 at a predetermined placement position is completed, so that the operator uses the input device 203 to sequentially input an instruction for retracting the end effecters 7 and 8 from the placement position and shutting off the electrical energy to the gripping finger drive actuator 3. The PC 202 relays the instructions to the PLC 204. The PLC 204 drives the X-Y moving mechanism 30 and the Z moving mechanism 50 to position the end effecters 7 and 8 at a specified position and returns the end effecters 7 and 8 to the original idling position (where they are in mutual contact) by cutting the electrical energy to the printing finger drive actuator 3 (See FIG. 11(A)). Accordingly, a series of operations using the micro-material handling system 200 is completed.

(Action)

Next, action and effect of the micro-material handling system 200 of the embodiment of the present invention will be described focusing on the micro-gripper mechanism 1 of the micro-manipulator 110.

As described above, the micro-manipulator 110 of the embodiment of the present invention (a) grips the micro-material 20 using the end effecters 7 and 8 fastened to the leading ends of the two gripping FIGS. 5 and 6; and (b) releases (or separates) the micro-material 20 by separating the end effecters 7 and 8 to place the micro-material at the placement position.

Firstly, in (a), generally the drive force from the actuator is much stronger than the force required to grip the micro-material. Accordingly, when the end effecters grip the micro-material, an impact acts upon the micro-material, thereby causing the micro-material to rebound. The micro-manipulator 110 of the embodiment of the present invention has the elastic hinges 5e and 6e of the gripping fingers 5 and 6 that deform after the end effecters 7 and 8 touch the micro-material 20, even if the gripping finger drive actuator 3 is driven by the shock. Therefore, little impact is applied to the micro-material 20, thereby preventing the micro-material 20 from rebounding or being damaged.

Next, in (b), the surfaces force has a great effect in a micro-region. For that reason, some micro-manipulators have tried to use vibration or shocks, and some manipulators have tried applying electrical field or heat to cause evaporation of moisture as methods for separating. The effect of eliminating the force between the surfaces has been attained. However, the effects are not stable with regard to the requirement of placing the micro-material at a desired placement position. The micro-manipulator 110 of the embodiment of the present invention has two devices for resolving the problems.

The first device for resolving the problem employs a phenomenon that the surfaces force is proportional to the contact surface area. The device eliminates the attachment of the end effecter 7 and 8 and the micro-material 20. In other words, when separating the end effecters 7 and 8, the end effecters 7 and 8 and the micro-material 20 become attached through the force between the surfaces. For that reason, before detaching the micro-material 20, the detachment end effecter 11 applies a large pressing force on the micro-material 20 through the attaching force. In this state, when the end effecters 7 and 8 release the micro-material 20, the force between the surfaces of the micro-material 20 and the detachment end effecter 11, the force between the surfaces of the micro-material 20 and the micro-material stage surface 17, and the pressing force from the detachment end effecter 11 applied to the micro-material 20 act on the micro-material 20. There is a residual force between the two surfaces when the pressing force of the detachment end effecter 11 is removed. Accordingly, when the contact surface area of the leading edge 11a of the detachment end effecter 11 to the micro-material 20 is smaller than the contact surface to the micro-material 20 of the micro-material stage surface 17, it is possible to place the micro-material 20 at a desired placement position on the micro-material stage surface 17.

In the embodiment of the present invention, the differences in the forces (attracting forces) between the surfaces caused by the surface area differences are applied. In some cases, the differences are not available. In such a case, as the second method, stepping voltages are input to the laminated piezoelectric element actuator 12 to vibrate. The vibrations are transmitted to the detachment end effecter 11 and applied to the leading end 11a. Accordingly, the attraction is completely released, so that the micro-material can be placed at a desired placement position even when no difference exists between the contact surface areas or there is the effect of an electrical field. Therefore, with the micro-manipulator 110, it is possible to resolve the problems in (a) and (b) described above by holding down the effect to the micro-material 20 to a minimum, particularly when the micro-material 20 is a living organism.

In the embodiment of the present invention, the gripping fingers 5 and 6 have the V-shaped portions integrated with the reversed T-shaped portions, and the elastic hinges 5e and 6e are disposed. The invention is limited to this configuration. In other words, the V-shaped portions and the reversed T-shaped portions can be separately mounted parts. It is also perfectly acceptable that the elastic hinge is made of an elastic body such as an elastic rubber having a neck portion with a cross section smaller than that of the other portion. In the embodiment, the micro-material 20 is pressed with the detachment end effecter 11. Alternatively, the second method (applying vibrations) described above is applied, and the detachment end effecter 11 does not necessarily need to press the micro-material 20. It is also perfectly acceptable to employ a configuration that simply touches the micro-material 20. Still further, the embodiment of the present invention discloses an example of causing both gripping figures to approach each other. It is also perfectly acceptable to drive (move) only one of the gripping fingers with the gripping finger drive actuator 3, and keep the other gripping finger stationery. The embodiment also described an example of the gripping direction of the end effecters 7 and 8 and the direction of vibration to the micro-material 20 to be orthogonal. The present invention is not limited to the configuration. It is also perfectly acceptable for the direction of vibrations and direction of gripping to be the same.

Second Embodiment

According to a second embodiment of the present invention, a micro-manipulator applied to a micro-material handling system for handling micro-materials will be explained below. According to the second embodiment, when opening two gripping fingers for gripping a micro-material, leading ends of the gripping fingers are excited. Note that according to the embodiment of the present invention, the same symbols are applied to configuring members t same as those in the first embodiment of the present invention. Therefore, explanations thereof are omitted and only difference will be described. Furthermore, explanations of actions same as those in the first embodiment of the present pension are omitted.

Figure 12:
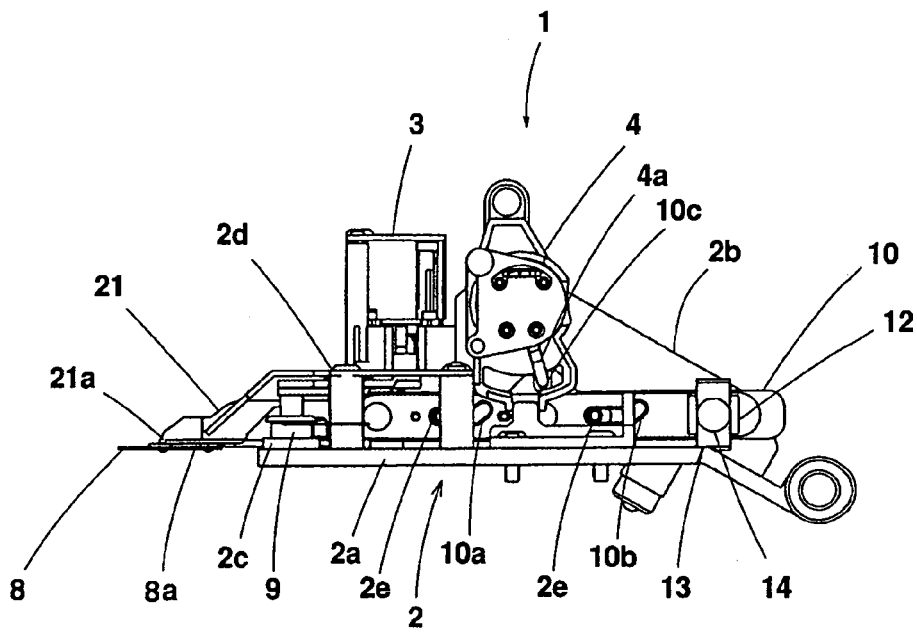
FIG. 12 is a side view of a micro-gripper according to a second embodiment of the present invention.
Figure 13:
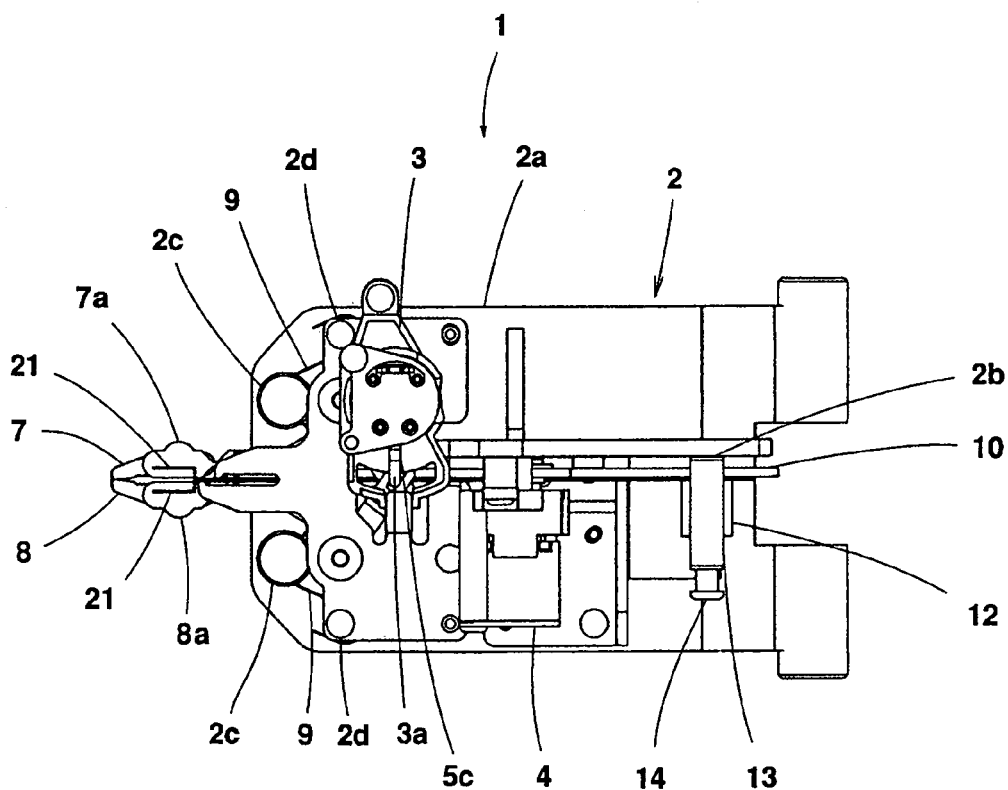
FIG. 13 is a plan view of a micro-gripper mechanism according to the second embodiment of the present invention.

As shown in FIGS. 12 and 13, a micro-manipulator mechanism 1 of the second embodiment has a member having a shape same as that of the detachment finger 10 in the first embodiment. Instead of the detachment end effecter 11 for pressing the micro-material 20, the detachments finger 10 has a different function in terms of having a vibration transmission member 21 for transmitting vibrations from a laminated piezoelectric element actuator 12 to both of the end effecters 7 and 8. The vibration transmission member 21 is separated into the two at the side of the end effecters 7 and 8, and the leading end 21a of the vibration transmission member 21 is able to touch the vibration receiving plates 7a and 8a configured as one body with the end effecters 7 and 8. Note that normally (when the detachment finger drive actuator 4 is not electrically energized) the leading end 21a maintains a non-contact status with the vibration receiving plates 7a and 8a.

With the micro-manipulator 110 of the embodiment of the present invention, after the micro-material 20 gripped by the end effecters 7 and 8 is placed at the placement position, an operator inputs instructions to separate the micro-material 20 from the end effecters 7 and 8 using the input device 203. The PC 202 converts the separating instructions from the input device 203 and then transfers the converted information to the PLC 204. The PLC 204 drives the detachment finger drive actuator 4, so that the arm 4a of the detachment finger drive actuator 4 rotates in the clockwise (cw) direction around the rotating shaft 4a-b against the self holding moment. The detachment finger 10 is guided to the lower right direction of FIG. 12 by the slit cams 10a and 10b that engage the boss 2e. The leading end 21a of the vibration transmission member 21 touches the vibration reception plates 7a and 8a of the end effecters 7 and 8.

When the separating instruction from the PC 202 is received, the PLC 204 drives the detachments finger drive actuator 4 to touch the leading end 21a of the vibration transmission member 21 to the vibration reception plates 7a and 8a. In this state, the PLC 204 inputs step voltages to the laminated piezoelectric element actuator 12 to vibrate. Vibrations of the laminated piezoelectric element actuator 12 propagate to the end effecters 7 and 8 from the leading end 21a via the vibration transmission member 21 and are transmitted to the portion touching the micro-material 20. In this state, the PLC 204 drives the gripping finger drive actuator 3 to separate the end effecters 7 and 8. The attraction generated by the surfaces forces of the end effecters 7 and 8 and the micro-material 20 is released by the vibration, thereby allowing the micrometer 20 to be placed at a predetermined placement position. Because the direction of the vibrations is orthogonal to the gripping direction of the micro-material 20 by the end effecters 7 and 8, a pressing force that acts on the micrometer of 20 is reduced. Therefore, the effect of the vibration on the organism is smaller when the micrometer 20 is a living organism. In the embodiment, the gripping direction of the end effecters 7 and 8 and the direction of vibration to the micro-material 20 are orthogonal. The present invention is not limited to this configuration. It is also perfectly acceptable for the direction of vibrations and direction of gripping to be the same.

POSSIBLE APPLICATION IN INDUSTRY

In the invention, the micro-manipulator has the two gripping fingers, and is capable of placing the micro-material at an intended place or position. Therefore, the invention is applicable to industry and contributes to the manufacture and sales of the micro-manipulator.

The disclosure of Japanese Patent Application No. 2004-166126, filed on Jun. 3, 2004, is incorporated in the application.

While the invention has been explained with reference to the specific embodiments of the invention, the explanation is illustrative and the invention is limited only by the appended claims.

What is claimed is:

1. A micro-manipulator comprising:

a gripping device having two gripping fingers for gripping a micro-material;

a gripping finger moving device for moving at least one of the gripping fingers; and one exciting device comprising a piezoelectric element disposed at a location away from the two gripping fingers, and a vibration transmission member operable to vibrate leading ends of the gripping fingers when the gripping fingers are opened to release the micro-material, wherein a leading edge of the vibration transmission member is arranged to transmit vibrations from the piezoelectric element to the leading ends of the gripping fingers, the gripping fingers further comprises vibration receiving plates disposed at the leading ends of the gripping fingers, and the leading edge of the vibration transmission member is configured to touch the vibration receiving plates, said vibration transmission member is arranged to move along a longitudinal direction thereof to contact the vibration receiving plates when the micro-material is released.

* * * * *